Figure 1:
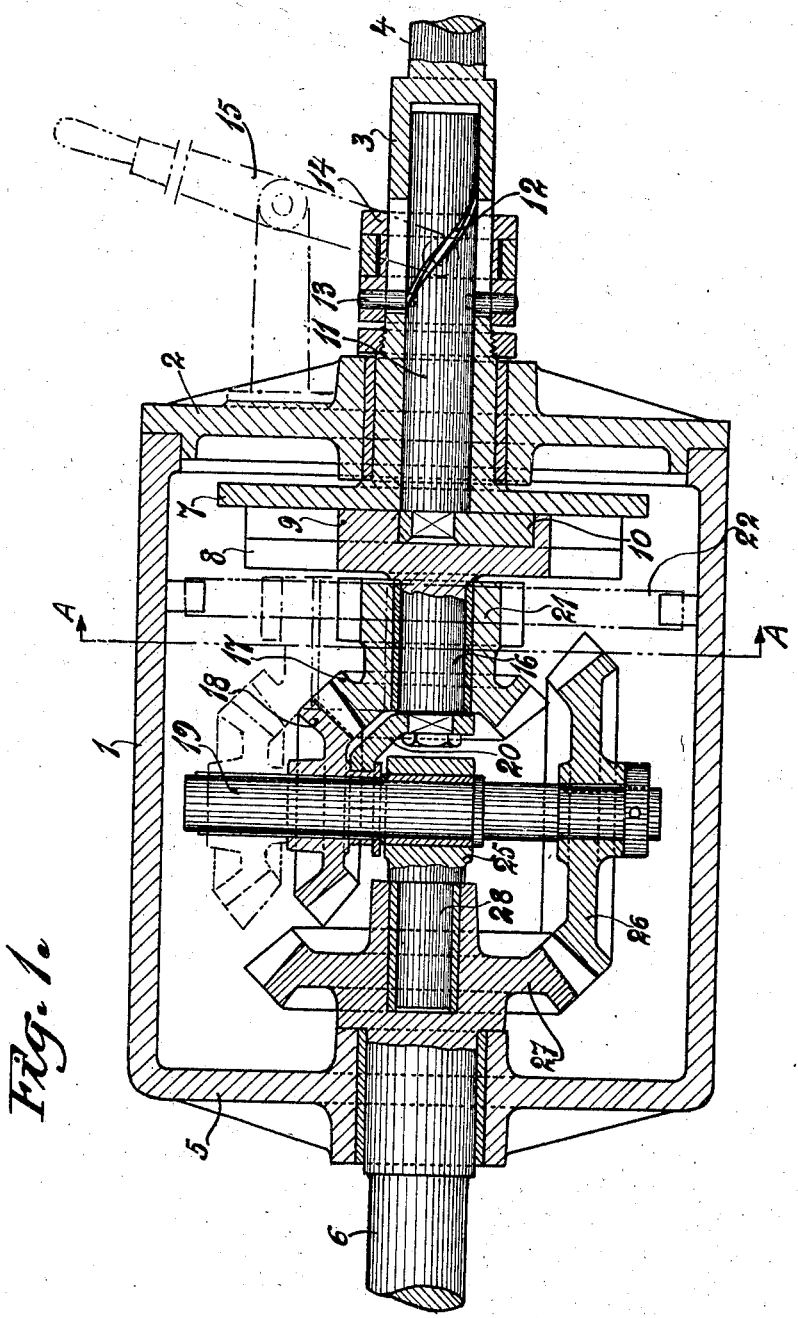

Feb. 9, 1926.   1,572,360
E. J. PETERSSON
VARIABLE POWER TRANSMISSION GEAR BETWEEN ROTARY SHAFTS
Filed Sept. 15, 1924    3 Sheets-Sheet 1

Ernfrid Julius Petersson
INVENTOR his ATTORNEY.

Feb. 9, 1926.
E. J. PETERSSON
1,572,360
VARIABLE POWER TRANSMISSION GEAR BETWEEN ROTARY SHAFTS
Filed Sept. 15, 1924    3 Sheets-Sheet 2

Ernfrid Julius Petersson
INVENTOR

By *[signature]* his ATTORNEY.

Feb. 9, 1926.                                              1,572,360
E. J. PETERSSON
VARIABLE POWER TRANSMISSION GEAR BETWEEN ROTARY SHAFTS
Filed Sept. 15, 1924          3 Sheets-Sheet 3

Ernfrid Julius Pettersson
INVENTOR his ATTORNEY.

Patented Feb. 9, 1926.

1,572,360

UNITED STATES PATENT OFFICE.

ERNFRID JULIUS PETERSSON, OF STOCKHOLM, SWEDEN.

VARIABLE POWER-TRANSMISSION GEAR BETWEEN ROTARY SHAFTS.

Application filed September 15, 1924. Serial No. 737,921.

*To all whom it may concern:*

Be it known that I, ERNFRID JULIUS PETERSSON, a subject of the King of Sweden, and resident of 52 Dalagatan, Stockholm, in the Kingdom of Sweden, have invented certain new and useful Improvements in Variable Power-Transmission Gears Between Rotary Shafts, of which the following is a specification, reference being made to the accompanying drawings.

In the case of power transmission between rotary shafts there occurs very often the need of changing the power transmission, so that the power from the power-supplying shaft can be utilized by the power-receiving shaft at various rotation speeds of the latter.

The usual toothed wheel gear case which is almost exclusively being used for obtaining the aforesaid desideratum suffers—as is well known—from rather great defects, e. g. it cannot with advantage be constructed for more than a few speeds and is furthermore very delicate for careless handling, which may result in broken teeth etc., on account of which it is necessary at every maneuver to resort to the anything but pleasant measure of disconnecting the power-supplying shaft.

By means of hydraulics it has been possible to bring about variable power transmission gears possessing the great advantage of permitting regulation within wide limits. These devices are, however, very expensive in their manufacture and require a large space, for which reasons they cannot be taken into consideration, except in the case of large power amounts, and even then their use is very restricted.

For obtaining a power transmission gear between rotary shafts (or other parts), which gear is advantageous in all respects, it must according to the preceding statements fulfill the following desiderata:

(1) Regulable within all limits between 0 and the maximum speed;

(2) The same capacity for power transmission and regulation when running either forward and back;

(3) Regulation without disconnection of the power-supplying shaft and without any risk whatever of damaging any parts of the machine;

(4) Easily reversible for moving in the opposite direction;

(5) Full security of the desired effect of the maneuver being attained in reversing as well as in regulating;

(6) Suitable for being manufactured for both large and small power amounts;

(7) Small space, and (8) Inexpensive to manufacture.

The present invention has for its object a variable power transmission gear between rotary shafts (or other rotary parts) in which gear the aforesaid desiderata have been attained.

A power transmission gear constructed according to this invention is chiefly characterized by a bevelled gear, corresponding to the power-supplying shaft and rotating round the centre line of said shaft, which gear is adjustable in the transverse direction of the power-supplying shaft, that wheel of the gear, which is supported by said shaft, being in any position, into which it is thus adjusted, acted upon by a track, which is non-rotating or rotating with another speed than the gear around said centre line.

Figure 2:
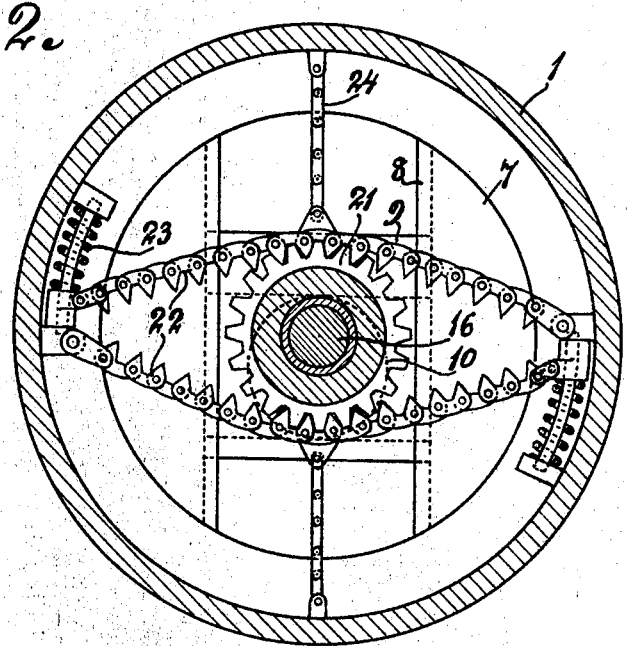
Figure 3:
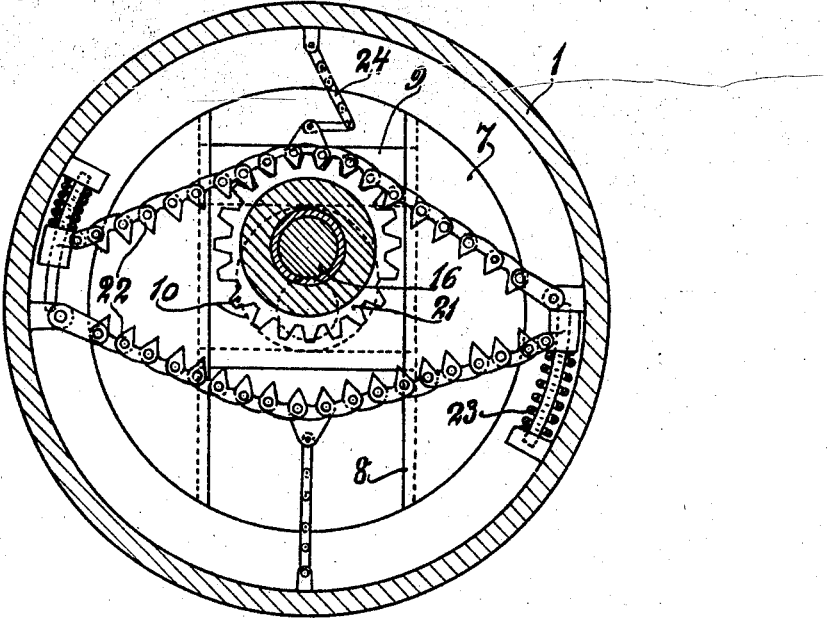
Figure 4:
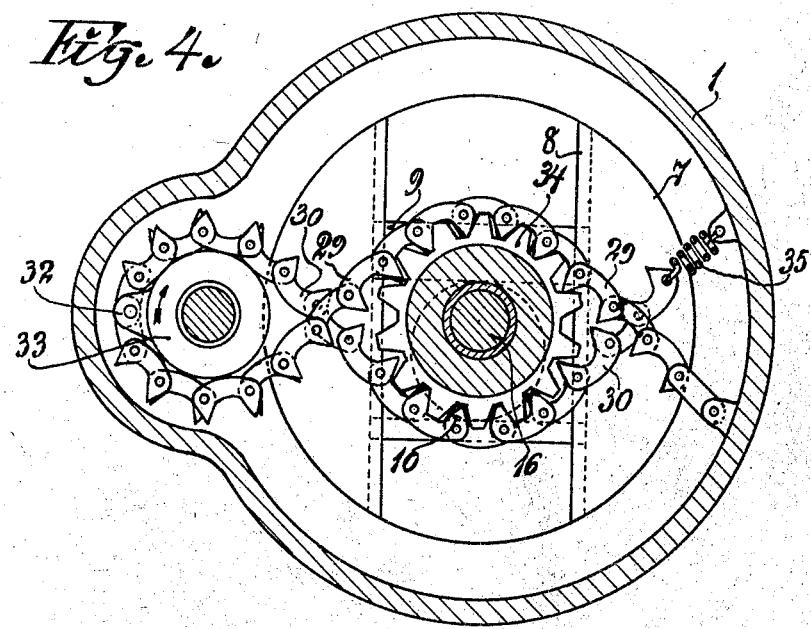
Figure 5:
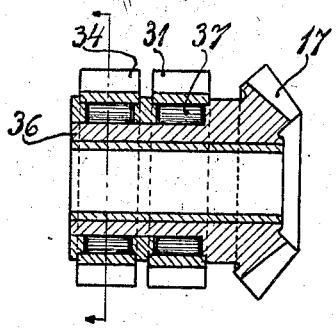
Figure 6:
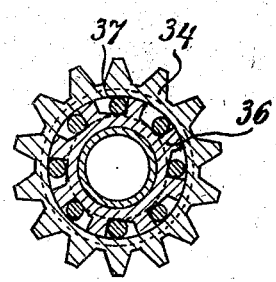

On the accompanying drawings is shown by way of example one form of construction of this invention. Fig. 1 shows a longitudinal section of a gear case, suitable for a motor car or a motor cycle, whilst Figs. 2 and 3 show transverse sections of the same, taken along the line A—A in Fig. 1 and with certain power transmitting parts in different positions. Figs. 4, 5 and 6 show sections of another form of the invention.

In one end piece 2 of a gear case 1 is journalled the sleeve-shaped end 3 of a power-supplying shaft 4, whilst in the other end piece 5 there is journalled a power-receiving shaft 6. The interior end of the sleeve 3 passes into a disc 7, at its one side provided with a guide 8 for a displaceable block or a slide 9. This slide is moved in the guide 8 with the aid of an excenter 10 located in the same, this excenter 10 being attached to a shaft 11 surrounded by the sleeve 3. In order to move the slide 9 in the guide 8 the excenter 10 is readjusted by means of the ordinary arrangement of pins 13 engaging screw shaped grooves 12 in the shaft 11, these pins 13 entering through the sleeve 3 from a sleeve 14, which is moved upon the sleeve 3 by means of a lever 15.

The slide 9 carries a pivot 16 upon which is loosely mounted a bevelled toothed wheel 17 which engages another, equally large bevelled toothed wheel 18, non-rotatably connected to a shaft 19, upon which the toothed wheel 18 can be moved. On the pivot 16 is attached a catch 20 acting upon the bevelled toothed wheel 18, so that the said wheel and the bevelled toothed wheel 17 are always engaging each other.

The bevelled toothed wheel 17 is integral with a cylindrical toothed wheel 21, which in every position of the slide 9 is in engagement with a non-rotating track. This track is formed in the case given as an example in Figs. 2 and 3 by two chains 22, situated opposite to each other and formed of teeth, between which the teeth of the toothed wheel 21 engage. The toothed chains 22 are at their ends connected to the gear case 1 by means of springs 23, which keep them stretched, besides which each toothed chain is at its middle connected to the gear case by means of a chain 24, which keeps the toothed chain in such a position that the toothed wheel 21 can engage it.

The shaft 19 is rotatably, but not displaceably mounted in a bearing 25, on one side of which the bevelled toothed wheel 18 is located, while on the other side of this bearing there is on the shaft 19 rigidly fixed a bevelled toothed wheel 26, which is in engagement with an equally large bevelled toothed wheel 27 on the power-receiving shaft 6. In the hub of the toothed wheel 27 there is a boring occupied by a rotatable pivot 28, which carries the bearing 25 for the shaft 19, so that the latter can freely turn round the centre line of the power-supplying shaft 3 or round the centre line common to this shaft and the power-receiving shaft 6.

The arrangement described operates in the following manner. When the pivot 16 is in such a position that its centre line coincides with the centre lines of the two shafts 4 and 6, no power transmission from the shaft 4 to the shaft 6 takes place. The toothed wheel 21 is then in engagement with the two toothed chains 22 and is therefore prevented from turning. The toothed wheel 18 will then roll on the toothed wheel 17 without any transmission of power, as the shaft 19 is brought by the catch 20 to swing round the centre line of the shafts 4 and 6 one revolution for each revolution of the toothed wheel 18 rolling on the toothed wheel 17. No rotation is therefore now imparted to the shaft 6. When the pivot 16 (in consequence of action upon the lever 15) and thus the toothed wheel gears 17, 18 is moved outwards, during which process the toothed wheel 21 in consequence of its alternating meshing with the toothed chains 22 is brought to rotate round the pivot 16, power transmission will occur between the shafts 4 and 6, so that the shaft 6 is made to rotate, and this power transmission or rotary motion increases according as the toothed wheel gears 17, 18 are removed from the centre line of the shafts 4 and 6. At a certain position of the gear the shaft 6 is made to rotate with the same speed as the shaft 4, and if the gear is moved beyond this position, the former shaft will get a greater speed than the latter. At power transmission between the shafts 4 and 6 the cylindrical toothed wheel 21 alternately engages the toothed chains 22.

At the device described there must be a special arrangement for bringing the shaft 6 to rotate in the opposite direction to the shaft 4 (running back). Running back the shaft 6 can, however, be brought about without any special arrangement and by a simple modification of the device described. As has been mentioned, the gear ratio between the bevelled toothed wheels 17 and 18 or 26 and 27 respectively is 1:1. If this ratio is altered, no power transmission between the shafts 4 and 6 takes place at a certain position of the centre line of the pivot 16 outside the centre line of the shafts 4 and 6, and rotation of the shaft 6 for running forward or back then occurs according to the pivot 16 being moved from the said position in one direction or the other.

The arrangement described can be carried out in other ways than that given by way of example. For instance, the toothed chains 22 may be replaced by another track with which the toothed wheel 21 is in mesh in every position, into which it has been adjusted. Such a form is shown in cross section in Fig. 4. The track is also in this case formed by two toothed chains 29 and 30. The one, 29, of these chains is at its one end articulated to the gear casing 1 and is in engagement with a toothed ring 31, which is journalled around the pivot 16, this chain being at its other end connected to a pin 32, which is carried by an oscillating disc 33, journalled in the end pieces of the gear casing. The other chain 30 is at its one end also connected to the pin 32, and is in engagement with another toothed ring 34, also journalled around the pivot 16, this chain being at its other end connected to the gear casing by means of a spring 35. Between each of the toothed rings 31 and 34 and a sleeve 36, which is firmly connected to the bevelled toothed wheel 17, there are clutch rollers 37, which work in the same direction.

In this arrangement the toothed rings 31 and 34 (which correspond to the toothed wheel 21 in Figs. 1 to 3) are in every position in engagement with the track formed by the toothed chains 29 and 30. If the rings are removed from their 0-position (compare Figs. 2 and 3), the pin 32 is, under the action of the spring 35, removed in the direction of the arrow (Fig. 4), and in consequence hereof the chain 29 as well as the chain 30 will be kept in engagement with the rings 31 and 34, independent of the size of their removal. The rings 31 and 34 will therefore uninterruptedly be rotated in the same direction, and this rotation will be transmitted through the clutch rollers 37 to the toothed wheel 17 and from thence further as described above.

Having now described my invention, what I claim as new and desire to secure by Letters Patent is:

1. A variable power transmission gear comprising a driving shaft, a driven shaft, a spindle eccentrically carried by the former, means for adjusting the eccentricity, a beveled gear loosely mounted on the spindle, beveled-gear transmission means cooperating with the beveled gear and the driven shaft and driven by the spindle, and means for causing the beveled gear to rotate upon the spindle at a speed directly proportional to the eccentricity of the latter.

2. A variable power transmission gear, as claimed in claim 1, said beveled-gear transmission means comprising a transverse shaft revolvably and concentrically journalled with respect to the driven shaft.

3. A variable power transmission gear as claimed in claim 1, said beveled-gear transmission means comprising a spindle rotatably and concentrically journalled in the driven shaft, and a rotatable transverse shaft carried by the last-named spindle transversely thereof.

4. A variable power transmission gear as claimed in claim 1, said beveled-gear transmission means comprising a transverse shaft revolvably and concentrically journalled with respect to the driven shaft, and gear means connecting the transverse shaft and the driven shaft.

5. A variable power transmission gear as claimed in claim 1, said last named means comprising a gear wheel movable with the beveled gear, and a yieldable rack constantly engaged by said gear wheel.

6. A variable power transmission gear as claimed in claim 1, said last named means comprising a gear wheel movable with the beveled gear, and a rack comprising a toothed chain constantly engaged by said gear wheel.

7. A variable power transmission gear as claimed in claim 1, including a guide track carried by the driving shaft, and a carrier for said spindle slidably mounted in said track and cooperating with said eccentricity-adjusting means.

8. A variable power transmission gear as claimed in claim 1, said last named means comprising gear wheels movable with said beveled gear, a yieldable rack constantly engaged by said gear wheels and comprising a toothed chain for each gear wheel having one end fixed, and an oscillating disc having a pin to receive the other ends of said chains.

In witness whereof I have hereunto set my hand.

ERNFRID JULIUS PETERSSON.